United States Patent Office 3,560,602
Patented Feb. 2, 1971

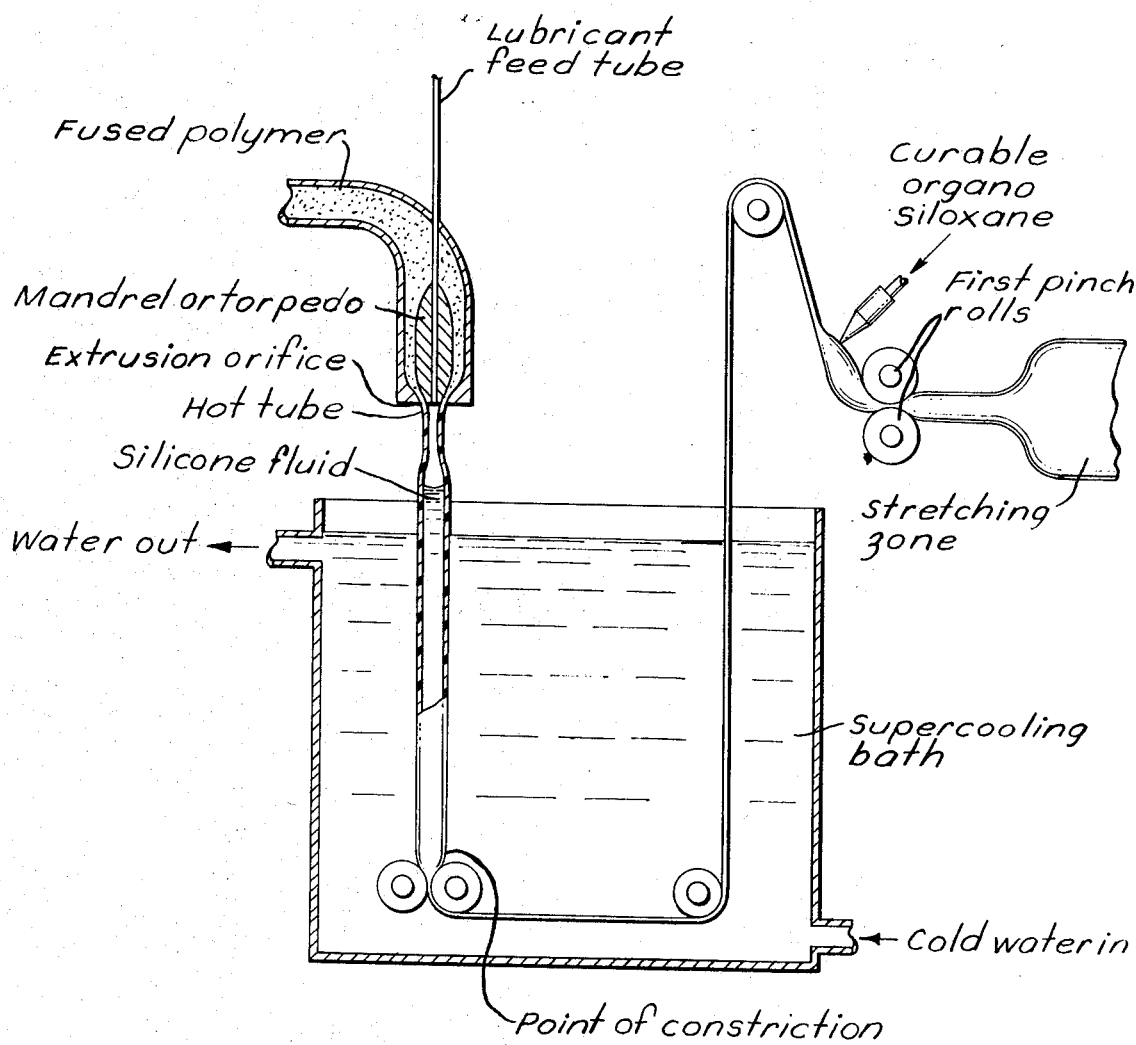

3,560,602
METHOD OF PREPARING CHLOROETHYLENE POLYMER FILM HAVING A PERMANENT, NON-TRANSFERABLE HIGH SLIP SURFACE AND AN OPPOSED LOW SLIP SURFACE
Richard T. Marzolf, Midland, and Kenneth L. Meddaugh, Linwood, Mich., assignors to The Dow Chemical Company, Midland, Mich., a corporation of Delaware
Filed July 29, 1968, Ser. No. 748,562
Int. Cl. B29c 17/07; B29d 23/04; C08g 47/00
U.S. Cl. 264—95                    2 Claims

ABSTRACT OF THE DISCLOSURE

This invention relates to a chloroethylene polymer film having a permanent, non-transferable high slip surface and an opposed low slip surface and a method of preparing the same by the continuous application of a curable organosiloxane to the interior surface of a tubular chloroethylene film having a prior coating of a non-curable silicone fluid thereon. Such film is particularly suited for use in packaging foodstuffs where a packaging film having an interior, non-transferable high slip surface and an exterior low slip surface is required.

---

The improved packaging films of this invention are prepared by utilization of a process consisting essentially of (1) extruding a thermoplastic film forming chloroethylene polymer downwardly through a tube die into a temperature regulating bath while a column of a non-curable silicone fluid is maintained within the freshly extruded tube, (2) applying a thin continuous second coating of a curable organosiloxane to the prior coated interior tube surface, (3) slitting the so-formed tubular film and rewinding the same to form a film product having a coated surface and an opposed non-coated surface, then (4) allowing the organosiloxane to cure to form a continuous non-transferable high slip surface.

An excellent and extensively practiced procedure for making packaging film from chloroethylene polymers including the normally crystalline vinylidene chloride compositions is set forth in U.S. 2,452,080, U.S. 2,488,571 and U.S. 2,634,459. The so illustrated conventional procedures involve the continuous thermal extrusion of a tube of fused polymers into a temperature regulating bath to supercool the tube. In the bath the tube is constricted between pinch rolls or equivalent devices while a column of a liquid is maintained within the freshly extruded tube. The internal liquid column provides for size control of the hot freshly extruded tube and may also be utilized to assist in cooling the tube. In addition, the internal column of liquid is frequently relied upon to accomplish lubrication of the interior surfaces of the tube to avoid cohesion of the inner walls after the tube has been flattened prior to subsequent handling such as orientation, slitting, re-winding, etc.

Generally, as described in the mentioned patents, a mineral oil or a mixture of mineral oil and water or sometimes glycols is utilized as the liquid constituent in the internal fluid column. The liquid column is frequently known and referred to as a "sock" or especially in the instances when an oleaginous substance such as mineral oil is contained therein as an "oil sock." Such materials have not been found to be useful for the purposes of the present invention as they fail to provide for an effective "wetting" of the interior surfaces of the film to permit a continuous coating of the subsequently applied curable organosiloxane.

U.S. 3,280,233 describes the advantages derived when utilizing certain silicone fluids as the liquid in the sock, particularly where the coated surface of the polymer film is to be subsequently metallized. It has been discovered, which discovery forms part of the present invention, that such silicone fluids effectively provide the wetting action necessary for the purposes of the present invention when used in conjunction with the hereafter prescribed curable organosiloxanes.

The silicone fluids employed as socks in the freshly extruded plastic film tube to be subsequently coated according to practice of the present invention are liquid materials that are polymeric substances comprised of repeating units of the general unit structure and empirical formula:

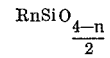

wherein R is any monovalent hydrocarbon or halogenated hydrocarbon radical and $n$ has a numerical value between about 1.95 and 2.2, advantageously in the neighborhood of 2. Of course, in homopolymeric materials each repeating unit is identical whereas in copolymeric products two (or more) specifically differing units, all of which fit within the above generic representation, are polymerized together. It is beneficial for the number of carbon atoms in the radical represented by the symbol R to be between 1 and about 8 (advantageously 1 to 6) when it is aliphatic in nature and between 6 and about 10 when it is aromatic. Typical of the substituents that may be attached to the silicon atom in the siloxane polymer fluids employed in practice of the present invention are phenyl, chlorinated and hydrocarbon (such as alkyl) substituted phenyl; methyl, chloromethyl, ethyl, chloroethyl and the like alkyl and substituted alkyl substituents; vinyl, allyl, cyclohexanyl; and so forth. Of course, mixed substituents within the above-indicated scope can be employed in siloxane polymers utilized as silicone fluids in practice of the present invention. Advantageously, the monovalent substituent represented by R in the siloxane polymer is phenyl methyl, ethyl and mixtures thereof. As is known, liquid siloxane polymers of the described type may be linear in nature or, in some instances, are characterized in having entirely or partially cyclic structures. Either type of configuration may be present in the materials employed in practice of the present invention.

Particular advantage is derived when the silicone fluid is a copolymer of phenyl methyl siloxane units and dimethyl siloxane units containing between about 20 and about 70 mole precent, desirably about 50 mole percent, of the former polymerized with the latter. Such a polymer may be represented by the structure:

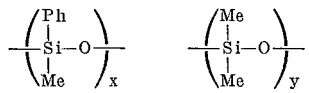

wherein the numerical values of $x$ and $y$ are such that the respective copolymerized units are in the range of the above-prescribed molar proportions. The molecular weight of such a siloxane copolymer product in liquid form containing about equimolar proportions of each polymerized recurring unit in its structure and having a viscosity at 25° C. of about 20 centistokes is about 1100, indicating that there are an average of about 15 polymerized recurring units in each polymer molecule. This somewhat illustrates the extent of ponderosity in the polymer molecules of the siloxane polymers employed as fluids in the practice of the present invention. A 50/50 mole percent phenyl methyl siloxane/dimethyl siloxane copolymer in liquid form having a viscosity at 25° C. of about 30 centistokes has a molecular weight of about 2300. Liquid copolymers of dimethyl siloxane of the general structure:

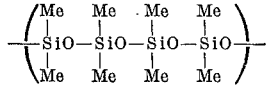

are also especially beneficial for use in practice of the present invention.

While any liquid silicone fluid may be utilized, it is generally desirable to employ these that are normally liquid substances at room temperature, especially those whose viscosity in centistokes at 25° C. is between about 10 and 50. A highly beneficial viscosity value for the silicone fluid that is employed is one that is at or closely in the neighborhood of 20 centistokes when measured at 25° C.

The film-forming organosiloxane compositions found to be useful for the purposes of the present invention are those materials which may be cured rapidly by air contact at room temperatures to form tough, flexible, tack-free, water-repellent films.

It has been found that mixtures comprised of a major portion of a soluble dimethylpolysiloxane high polymer and a minor portion of a methylhydrogensiloxane fluid, as described in U.S. 2,588,393, are particularly effective for the purposes of the present invention. Preferred organosiloxanes are mixtures comprising a major portion of a dimethylpolysiloxane polymer which is soluble in benzene and has a plasticity number greater than 30 expressed in thousandths of an inch where such plasticity number is determined upon a 4.2 gram test sample at 25° C. with a 3 minute duration of bond in accordance with ASTM–D 926–47 T; and wherein the methylhydrogensiloxane fluid is of the general formula

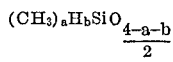

$$(CH_3)_a H_b SiO_{\frac{4-a-b}{2}}$$

in which $a$ has a value of from 1.0 to 1.5, $b$ has a value of from 0.75 to 1.25, and the sum of $a$ and $b$ has a value of from 2.0 to 2.25.

Although the above mixtures may be cured by contact with air to a tack-free condition, it is often advantageous to incorporate a catalyst into the mixture to accelerate the curing rate particularly where it is desirable to air-dry coatings formed from such mixtures to a tack-free state without resorting to elevated temperatures. A wide choice of such catalysts is available, since any metal salt of a carboxylic acid is applicable when present in an amount equal to about 1 to 5 percent by weight, based on the metal constituent and the weight of the organosiloxane constituent. The mixtures described herein may be prepared by admixture of the necessary ingredients by any appropriate method such as milling or the use of any mechanical mixer or by the use of appropriate solvents if so desired.

As indicated, practice of the present invention is particularly useful for the manufacture of packaging film, based on chloroethylene polymers and particularly from the normally crystalline vinylidene chloride polymers; whereby such films are characterized by having a permanent, non-transferable high slip surface and an opposed relatively low slip surface. The normally crystalline vinylidene chloride polymers, as may be determined by X-ray diffraction studies, include copolymers of vinylidene chloride chloride with vinyl chloride and acrylonitrile and the like that generally contain in the polymer molecule at least about 70 and preferably at least about 80 weight percent of the comonomer (or mixture of comonomers) polymerized with the vinylidene chloride.

The invention as described may be understood with reference to the accompanying drawings, the single figure of which is a partially diagrammatic and partially sectional elevation of an apparatus useful in carrying out the invention showing the extrusion of the tubular film, the location of the desired "sock," the constricting of the tube in the supercooling bath, and the subsequent addition of the curable organosiloxane to the interior of the film tube just prior to passage of such tube through the first pinch rolls with subsequent orientation, slitting and rewinding of the film material.

In a typical specific illustration of the invention, a plastified, crystalline, film-forming copolymer of vinylidene chloride and vinyl chloride that contained about 85 weight percent of vinylidene chloride polymerized in the polymer molecule was fused and extruded at a rate of about 100 pounds per hour at its fusion temperature of about 173° C. through a tube from an orifice having an outside diameter of about 3.50 inches and an orifice opening with a radial thickness of about 0.060 inch. The hot, freshly extruded tube was passed downwardly from the orifice directly into a supercooling bath of water maintained at a temperature in the range from 2° to 7° C. A quantity of a normally liquid siloxane copolymer consisting of about equimolar proportions of copolymerized units of phenyl methyl siloxane and dimethyl siloxane having a viscosity at 25° C. of about 20 centistokes was maintained inside the tube so that its surface was about ¾ inch above that of the cold water bath. The film tube was constricted within the bath, after being withdrawn from the orifice and cooled, between a pair of flattening and withdrawing rolls positioned within the bath so that the total height of the silicone fluid column in the sock was about 10 inches. The silicone fluid in the sock was allowed to be heated to and remain at an equilibrium temperature throughout the extrusion of about 80° C.

The tubular film was then passed upward out of the bath, over an idler roll and between a pair of pinch rolls. Just prior to the entry of the film into the pinch rolls a curable organosiloxane was injected between the layers of the tubular film. The organosiloxane was in the form of an emulsion containing about 40 weight percent of a mixture comprised of a major proportion of a benzene soluble dimethylsiloxane polymer having a plasticity number of greater than 30, and a minor portion of a methylhydrogensiloxane fluid. The emulsion additionally contained small amounts of an organo-tin salt as a catalyst. The so-injected organosiloxane was metered back along the tubular film as the film was forwarded through the pinch rolls. Pressure variation on such pinch rolls was used to control the coating thickness. It was observed that the organosiloxane formed a uniform continuous coating on the interior film surfaces.

Following the application of the organosiloxane, the film tube was then oriented by stretching using an internal distending air bubble in a known manner (not shown). The oriented film was then wound up, slit and rewound to provide a film product having a uniform, continuous coating of an organosiloxane which when cured provided a film to metal coefficient of friction of 0.20; and an opposed non-coated side having a film to metal coefficient of friction of 1.45.

By way of comparison, film prepared as described above but wherein the curable organosiloxane was not used, failed to provide a film product having a high slip surface and an opposed relatively low slip surface. This is explained by the fact that in the absence of the curable organosiloxane coating, the non-curable silicone fluid coating is readily transferred from one film surface to another upon slitting and rewinding of the tubular film, thus resulting in a film having opposed surfaces of essentially the same slip properties.

Further, it has been found that film prepared utilizing the curable organosiloxane coating as described herein but where a mineral oil was substituted for the non-curable silicone fluid, was characterized by having a non-uniform, discontinuous coating of the curable organosiloxane. This is explained by the fact that the curable organosiloxane does not effectively wet the film surface in the presence of the mineral oil.

Still further, it has been found that introduction of the curable organosiloxane in the sock, as a replacement for the non-curable silicone fluid, fails to provide the desired results as the pot life of the curable organosiloxane is too short under the necessary processing conditions, resulting in a premature curing and a discontinuous application of the coating material.

Thus, the present invention is dependent upon the utilization of both the non-curable silicone fluid and the curable organosiloxane in the manner prescribed to provide film products having the desired slip properties. Further, in such method the coating materials are all contained within the film tube itself so that the introduction of undesirable contaminants, as is encountered with other conventional coating processes, is essentially completely eliminated.

Similar good results as set forth herein are obtained utilizing any of the specifically required and disclosed ingredients in the manner described.

We claim:
1. A process for preparing chloroethylene polymer film from tube stock, said film having a continuous non-transferable high slip surface and an opposed low slip surface wherein said process consists of the sequential steps of:
   (1) extruding said chloroethylene polymer by a procedure wherein said polymer is extruded downwardly through a tube die into a temperature regulating bath while a column of a non-curable silicone fluid which is liquid at the temperature of operation of the column is maintained within the freshly extruded tube, said non-curable silicone fluid being a polymeric substance comprised of repeating units of the general unit structure:

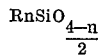

wherein R is selected from the group consisting of monovalent aromatic hydrocarbon radicals containing between 6 and about 10 carbon atoms, monovalent halogenated aromatic hydrocarbon radicals containing between 6 and about 10 carbon atoms, monovalent aliphatic hydrocarbon radicals containing between 1 and about 8 carbon atoms, monovalent aliphatic halogenated hydrocarbon radicals containing between 1 and about 8 carbon atoms and mixtures thereof, and $n$ has a numerical value between about 1.95 and about 2.2,
   (2) applying a thin continuous second coating of a curable organosiloxane to the prior coated interior surface of the tube wherein said curable organosiloxane composition is a mixture of a major portion of a dimethylpolysiloxane polymer and a minor portion of a methylhydrogensilicone fluid wherein said dimethylpolysiloxane polymer is soluble in benzene and has a plasticity number greater than 30 expressed in thousandths of an inch, said plasticity number being determined upon a 4.2 gram test sample at 25° C. with a 3 minute duration of bond in accordance with ASTM-D 926-47 T and said methylhydrogensiloxane fluid is of the general formula

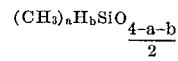

in which $a$ has a value of from 1.0 to 1.5, $b$ has a value of from 0.75 to 1.25, and the sum of $a$ and $b$ has a value of from 2.0 to 2.25; and
   (3) slitting the so-formed tubular film and rewinding the same to form a film product having a coated surface and an opposed non-coated surface, then
   (4) allowing the curable organosiloxane coating to cure to form a continuous non-transferable high slip surface.

2. The process of claim 1 wherein said chloroethylene polymer is a normally crystalline polymer of vinylidene chloride.

References Cited
UNITED STATES PATENTS

| | | | |
|---|---|---|---|
| 2,588,393 | 3/1952 | Kauppi | 260—825 |
| 3,004,871 | 10/1961 | Leavitt | 260—825 |
| 3,160,917 | 12/1964 | Berggren et al. | 264—209 |
| 3,280,233 | 10/1966 | Wiggins et al. | 264—89 |
| 3,328,482 | 6/1967 | Northrup et al. | 260—825 |

ROBERT F. WHITE, Primary Examiner

J. R. THURLOW, Assistant Examiner

U.S. Cl. X.R.

260—29.1, 825; 264—173, 209